G. A. ROGERS.
MACHINE FOR EXAMINING AND TESTING THE EYES.
APPLICATION FILED FEB. 20, 1911.
1,013,316.
Patented Jan. 2, 1912.
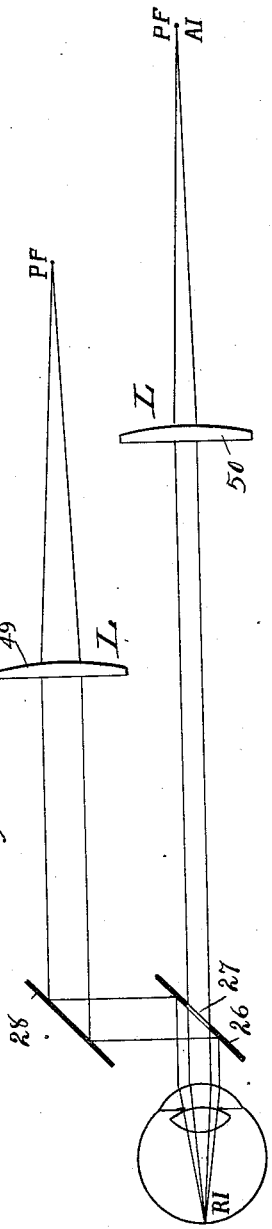
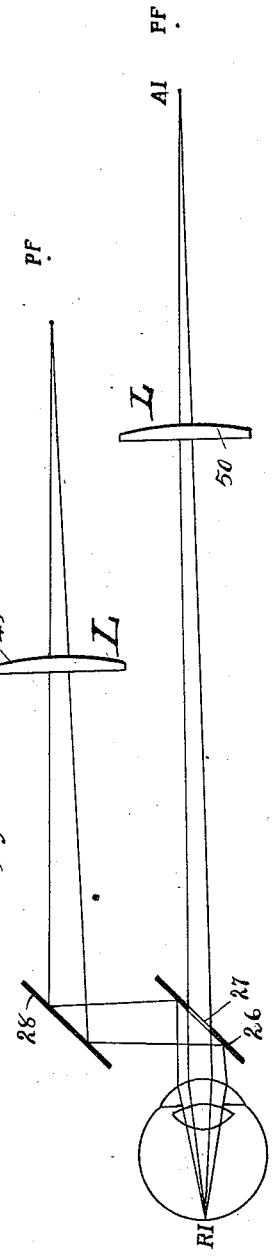
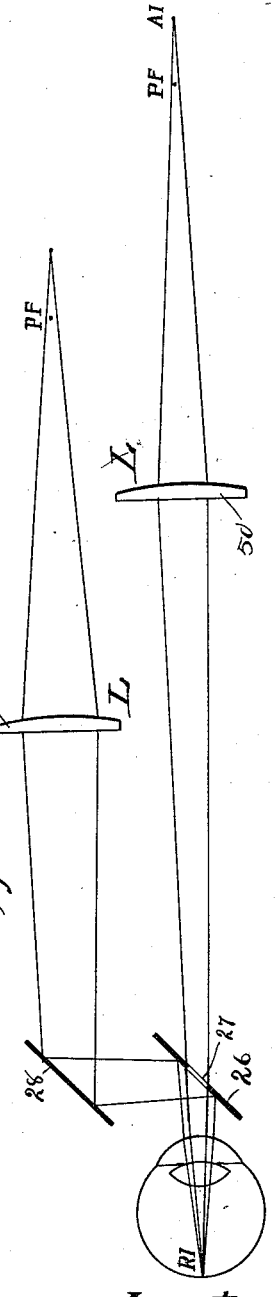

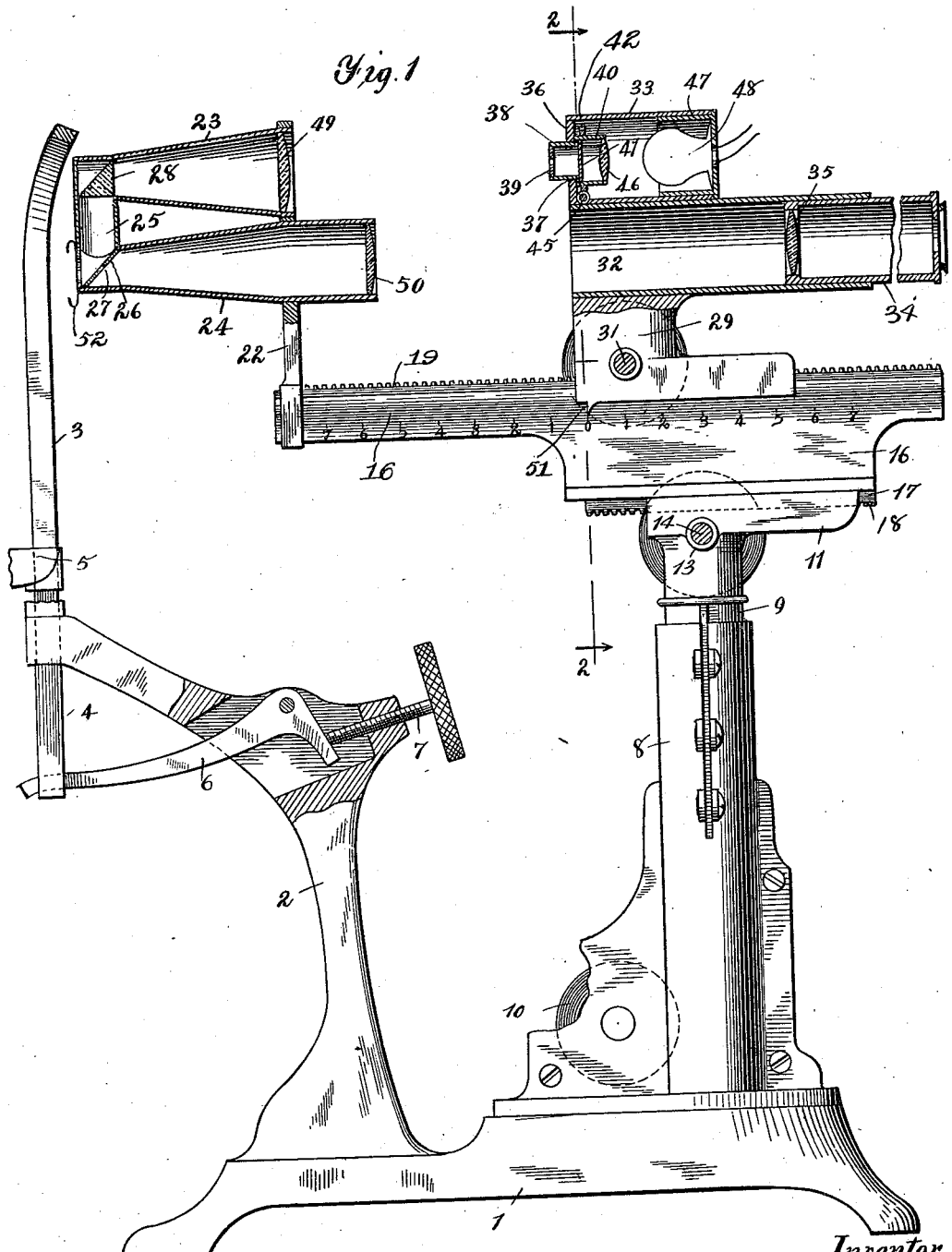

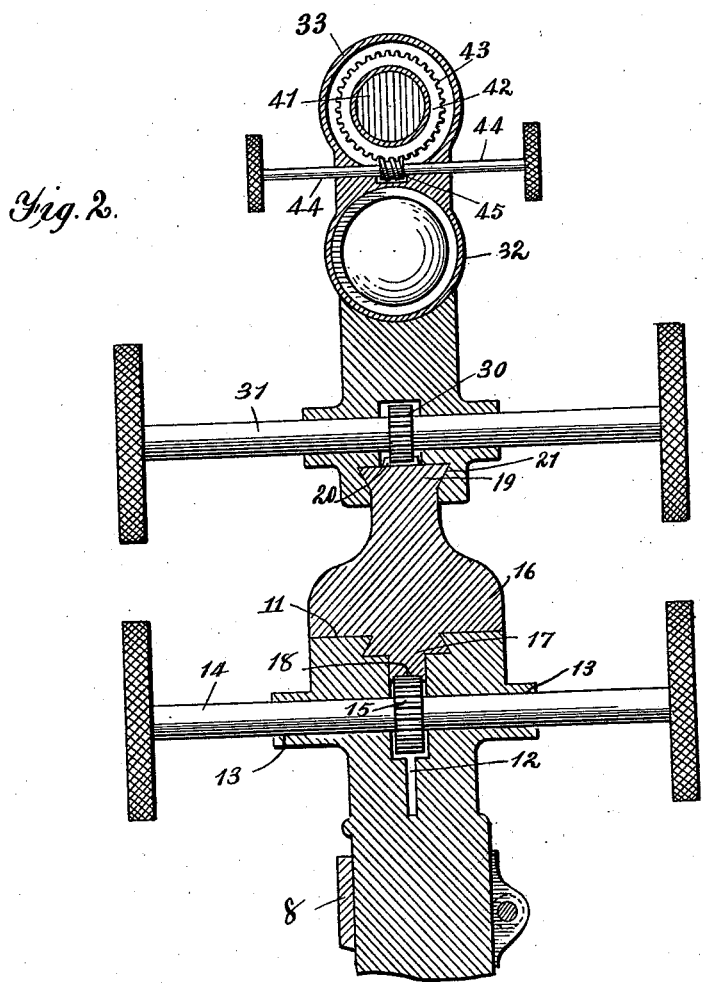

UNITED STATES PATENT OFFICE.

GEORGE A. ROGERS, OF CHICAGO, ILLINOIS, ASSIGNOR TO F. A. HARDY & COMPANY, A CORPORATION OF ILLINOIS.

MACHINE FOR EXAMINING AND TESTING THE EYES.

1,013,316.          Specification of Letters Patent.          Patented Jan. 2, 1912.

Application filed February 20, 1911. Serial No. 609,656.

*To all whom it may concern:*

Be it known that I, GEORGE A. ROGERS, a citizen of the United States, residing at Chicago, in the county of Cook and State of Illinois, have invented a new and useful Machine for Examining and Testing the Eyes, of which the following is a specification.

My invention relates to improvements in machines for examining and testing the eyes in which the refractive power of the media of the eye may be directly tested and measured; and the objects of my improvement are, first, the provision of means for projecting into the eye an image properly modified in accordance with the refractive properties of the eye so as to focus upon the retina, in combination with other means for projecting from the eye and forming an aerial or real image of the image focused upon the retina; second, in such an instrument the disposition of the lenses so that the same movement necessary to focus the image upon the retina will focus the aerial or real image; third, in such an instrument means for magnifying the aerial or real image; fourth, in such an instrument the arrangement of the elements so that there will be no back or surface reflection from the lenses to obscure the aerial or real image; and, fifth, means for reading the refractive properties of the eye from the adjustment necessary in focusing. With such an instrument, it will, of course, be possible to illuminate the retina without projecting an image upon it, in which case an illuminated image of the retina will be projected for examination.

I attain the above objects by means of the mechanism illustrated in the accompanying drawing, in which—

Figure 1 is a side elevation of my invention, partially in section; Fig. 2 is a transverse section on line 2—2 of Fig. 1; and Figs. 3, 4, and 5, are diagrammatic views along the optical axis of the instrument.

Similar reference numerals refer to similar portions throughout the several views.

The reference numeral 1 designates a base, from the forward portion of which rises an arm, 2, terminating in an oval frame or rest, 3, for steadying the head of the patient. The arm, 2, at the point at which it connects with the rest, 3, has provided therein a vertical hole, in which slides a shaft, 4, upon the upper end of which is a chin rest, 5. The lower end of the shaft, 4, is engaged by an angled lever arm, 6, pivoted to the arm, 2. A knurled headed adjusting screw, 7, the end of which impinges against the lever arm, 6, is also provided in the arm, 2, whereby the vertical position of the chin rest, 5, may be adjusted. From the opposite end of the base, 1, rises a hollow columnar bracket, 8, in which is slidably mounted the column or pillar, 9. Suitable mechanism, operable through the knurled head, 10, is provided for adjusting the vertical position of the column, 9, in the bracket, 8. The top of the column, 9, terminates in the horizontal table, 11, through the central portion of which is provided the slot or channel, 12, which is broadened and beveled inwardly adjacent to the top of the table. A suitable bearing, 13, is provided transversely through the table, 11, and slot, 12, for a shaft, 14, upon which, in the slot, 12, is mounted a gear, 15. Suitable milled heads are provided upon the ends of the shaft, 14, for turning same.

Mounted upon the table, 11, is a carriage, 16, having a rib 17, upon the under surface thereof shaped to fit the slot, 12. Upon the bottom of the rib, 17, is cut a rack 18, which meshes with the gear, 15.

The above described mechanism comprises a convenient mounting for my invention, in that the face and eye of the patient may be easily located and steadied by the face and chin rests, while the carriage, 16, which carries the mechanism now to be described, may be elevated or depressed by elevating or depressing the pillar, 9, and racked backward or forward to bring the mechanism in suitable position for examining eyes of any location and either deep-set or protruding. The above described mechanism, however, may be varied at will as my invention might be mounted in other ways.

The top of the carriage, 16, is extended longitudinally to form a track, 19, of suitable length. From the center of the top of the track projects a rack, 20, and the sides of the track are cut away at 21, so as to dove-tail the track with the carriage which it carries.

Rising from the forward end of the track, 19, is the standard, 22, and in this standard disposed parallel with each other are the lens tubes, 23 and 24. At their forward ends these lens tubes are connected by the passageway, 25, at right angles thereto. At the intersection or juncture of the tubes, 23 and 25, is disposed means, 28, for reflecting the light entering the tube 23 into the passageway 25, and at the juncture of the tubes 25 and 24 is disposed a mirror 26 at an angle of 45 degrees with the axis of said tube and passageway so that light from the passageway 25 will be reflected as if coming from the tube 24. Either a small central aperture 27 is provided in the mirror, 26, or the reflecting composition is removed from the back of the mirror at that point. This aperture or transparent portion should be oval in outline, and have its greater axis set at right angles to the axis upon which the mirror may be regarded as having been rotated, in order to counteract the effect of setting the mirror at an angle, and present an aperture of circular outline to the axis of the tube, 24.

The means, 28, for reflecting the light from the tube, 23, into the passageway, 25, may be either a very thin mirror, which has little difficulty from surface reflection, or a 45 degree prism, as shown in the drawing, which gives a more complete reflection than a mirror.

The carriage, 29, which is adapted to travel upon the track, 19, is slotted above the rack, 20, and a gear, 30, which meshes with said rack, is disposed within said slot upon a shaft, 31, substantially similar to the arrangement of the shaft, 14.

Mounted upon the carriage, 29, are tubes, 32 and 33, the axes of which aline respectively with the axes of the tubes, 24 and 23. Into the rear end of the tube, 32, telescopes an ordinary eye-piece, 34, provided with a magnifying lens or lens system, 35, as may be desired. The forward end of the tube, 33, is closed with a partition, 36, having a central aperture, 37, therein. The aperture, 37, forms a bearing for a tube, 38, in the forward end of which is provided a diaphragm, 39. The rear of the tube, 38, is secured in a tube, 40, of larger diameter the forward end of which forms a shoulder which abuts against the inner surface of the partition, 36. The rear end of the tube, 38, forms a shoulder within the tube, 40, which serves to locate within said tube, 40, a target, 41, made by photographic or other suitable process so that it may be illuminated from the rear. About the forward portion of the tube, 40, is a flange, 42, the periphery of which is provided with teeth, 43. A transversely disposed shaft, 44, is mounted in the carriage, 29, just below or tangential with the flange, 42, the central portion of which is provided with a worm, 45, which meshes with the teeth, 43, so as to permit of the rotation of the tubes, 38 and 40, and the target, 41, mounted therein. The above structure is for the purpose of permitting the lines of the target to be brought upon any meridian of the eye so as to be able to carefully examine the refractive properties of the eye upon any desired meridian. A condensing lens, 46, is mounted in the rear end of the tube 40. The rear end of the tube, 33, is closed by a cap, 47, in which is mounted an incandescent electric light bulb, 48, although other forms of illumination may be employed.

Mounted in the rear end of the tube, 23, is a lens 49, the focal length of which is such as to bring its principal focus after reflection by the prism, 28, and mirror, 26, just in front of the forward end of the tube, 24. Another lens, 50, of the same focal length as the lens, 49, is mounted in the tube, 24, a distance equal to its focal length back of the said point of the principal focus of the lens, 49.

It will now be seen, especially with reference to the diagrammatic views, 3, 4, and 5, that when the target, 41, is brought into the principal focus of the lens, 49, light emanating from the translucent target, 41, will be projected in parallel rays forwardly through the tube, 23, to the reflecting means, 28, where it will be reflected down the passageway, 25, to the mirror, 26, from whence it will be reflected forwardly into the eye of the patient. With a normal or emmetropic eye such parallel rays will be properly focused upon the retina thereby producing an image of the target upon the retina. This condition is illustrated in diagrammatic Fig. 3. The rays of light emanating from this image upon the retina which reach the aperture or clear space, 27, in the mirror, pass therethrough backwardly through the tube, 24, to the lens, 50. In the condition now assumed in which the eye is emmetropic the light emanating from the image upon the retina issues from the eye in parallel rays. Such light will be focused by the lens, 50, at its principal focus thereby forming an aerial or real image at this point, and as the lenses 49 and 50 are of equal focal length, this will be the same distance from the lens, 50, as the target, 41, is from the lens, 49. This aerial or real image may be magnified and examined by means of the lens, 35, in the eye-piece, 34, in the usual manner, and this eyepiece may be slid into or withdrawn from the tube, 32, to permit of the desired focus or adjustment and for the correction of any defect in the eye of the observer. In the diagrammatic views the principal foci of the lenses are designated by the letters P, F; the point at which the image upon the retina is formed is designated by R I; the point at which the aerial or real image is formed is designated by A I; and the lenses are designated by L.

Diagrammatic Fig. 4 illustrates the adjustment of the instrument in a myopic condition of the eye. In such a condition parallel rays entering the eye would be focused before the retina was reached, and, therefore, in order to properly focus an image upon the retina of the eye, it is necessary to diverge the rays entering the eye. This is done by moving the target from its principal focus toward the lens. Rays emanating from an image upon the retina of a myopic eye will be converged instead of parallel, and such rays passing through the aperture, 27, to the lens, 50, will be focused nearer to the lens than its principal focus, and this distance is just the same as the target, 41, had to be moved toward the lens, 49, in order to correct this same excess of refractive power in the eye.

In diagrammatic Fig. 5 a hypermetropic or hyperopic condition is illustrated. In this condition parallel rays would be brought to a focus back of the retina, therefore, to properly focus an image upon the retina, the rays must be converged. This is accomplished by moving the target from the position of its principal focus away from the lens. In such a condition, because of a deficiency in the refractive properties of the eye, rays emanating from an image upon the retina would leave the eye in a divergent direction. Such divergent rays which pass through the aperture, 27, to the lens, 50, would be focused at a point back of the principal focus of said lens, and this distance would be just the same as the target had to be moved in order to correct the same deficiency. In other words the target and a point to the rear and below it in the tube, 32, are conjugate with respect to the lens system when an eye is in position for observation, and it will be noticed that this point remains constant with respect to the eye-piece, 34, and lens, 35.

A pointer, 51, extends downwardly from the carriage, 29, and when the carriage is in position to bring the target in the principal focus of the lens, 49, the position of the pointer is marked upon the track and the marking is designated zero. Forward and backward from the zero mark the track is marked with a dioptric scale, that is, the amount of divergence or convergence secured by locating the target at any particular point is shown as multiples of the amount of divergence or convergence secured by a lens of a meter focal length as a unit. It will now be seen that when an eye is under examination, and a properly focused image is secured in the tube, 32, the position of the pointer upon the scale will indicate what, if any, divergence or convergence of the rays entering the eye was necessary in order to secure the focus in the ordinary terms employed for denoting the strength of lenses. As before said, the eye can be illuminated by dispensing with the target and, in such case, an illuminated aerial or real image of the retina may be secured.

In Fig. 1, will be seen upon the forward end of tube, 24, a lens clip or lens cell, 52, in which a lens of known power may be slipped in cases where the eye would require extreme correction. It will be seen, further, that the aperture, 27, in the mirror, 26, is positioned so close to the eye that no image of said aperture could be focused upon the retina, which would interfere with the aerial or real image of the target, or the aerial image of the retina. It will also be noted that the light passes from the target to the retina and from thence to the position of the aerial or real image, and that there are no lens or other surfaces which reflect light to the point of observation, except such as compose the aerial or real image.

Having thus described my invention, what I claim as new and desire to secure by Letters Patent, is:—

1. In an apparatus for testing the eyes, parallel lens systems comprising lenses of equal focal length, reflectors for reflecting the rays of one system into coincidence with the axis of the other, said systems being arranged to have a common point of principal focus, an aperture in one of said reflectors which lies in the axis of both of said systems, a single carriage disposed in the separate portions of the axes of said systems, means disposed upon said carriage for illuminating one of said systems, and other means also carried by said carriage for observing the image formed by the other of said systems.

2. In an apparatus for testing the eyes, two lens systems having a common point of principal focus, a mirror disposed at a point of coincidence in said systems, an aperture in said mirror for permitting rays from the point of common focus to pass into one of said systems, means for illuminating one of said systems, means for observing the image projected in the other of said systems, and a single carriage for supporting said two last mentioned means.

3. An optical instrument comprising two lens systems having a common point of principal focus, a carriage, means carried thereby for projecting light from a target through one of said systems to said common focus, and means also disposed upon said carriage for observing the image formed by the other of said systems.

4. An optical instrument comprising two lens systems of equal focal length having a common point of principal focus, means for projecting light from an object through one of said systems to said point of common focus, and means for observing the image formed by the other of said systems from the rays proceeding from said point of common focus.

5. An optical instrument comprising two lens systems of equal focal length having a common point of principal focus, means for projecting light from an object through one of said systems to said point of common focus, means for observing the image formed by the other of said systems from the rays proceeding from said point of common focus, and a single means for adjusting said projecting and observing means.

6. An optical instrument comprising two lens systems having a common point of principal focus, a carriage, means carried thereby for projecting light from a target through one of said systems to said common focus, adjustable means also disposed upon said carriage for observing the image formed by the other of said systems, and means for rotating said target.

7. In an apparatus for testing the eyes, means for locating an eye, lens systems of equal focal length disposed with a point of common principal focus adjacent said eye location, a carriage, a target disposed thereon adjacent the opposite principal focus of one of said systems, means also disposed upon said carriage for observing the real image formed adjacent the opposite principal focus of the other of said systems.

8. An optical instrument comprising lenses of equal focal length, a target disposed in the axis of one of said lenses, means for reflecting a portion of the rays proceeding through said lens from said target, said other lens being disposed in the axis of said rays after reflection and an equal distance from the conjugate of said target, and means for observing the real image produced by said second lens of rays proceeding from said conjugate point.

9. An optical instrument comprising two lens systems of equal focal length, reflecting means, said systems being so disposed with relation to said reflecting means as to have a common principal focal point, a target situated in the axis of one of said systems, means for moving said target so as to cause an image of said target to be formed in the direction of said common focal point, and an eye piece carried by said last mentioned means for observing the real image formed by the other of said systems of rays proceeding from said common focal point.

10. An optical instrument comprising two lens systems of equal focal length, reflecting means, said systems being so disposed with relation to said reflecting means as to have a common principal focal point, a target situated in the axis of one of said systems, means for moving said target so as to cause an image of said target to be formed in the direction of said common focal point, an eye piece carried by said last mentioned means for observing the real image formed by the other of said systems of rays proceeding from said common focal point, and a dioptric scale for indicating in the terms of focal length of the lenses the movement imparted to said target.

11. An apparatus for determining the refraction of the eye comprising means for locating an eye, two lens systems having a common point of principal focus, means for projecting light from a target through one of said systems to said common focus, and means for adjusting said systems relatively to the location of the said eye.

12. An optical instrument comprising two lens systems having a common point of principal focus, means for projecting light from an object through one of said systems to said point of common focus, and means for observing the image formed by the other of said systems.

13. In a machine for examining and testing the eyes a plurality of lens systems, said systems being located with relation to each other so that they are in axial and focal coincidence through a portion of their extent.

In testimony whereof I affix my signature in the presence of two witnesses.

GEORGE A. ROGERS.

Witnesses:
CHAS. F. BASSETT,
BENJ. T. ROODHOUSE.

Copies of this patent may be obtained for five cents each, by addressing the "Commissioner of Patents. Washington, D. C."